No. 606,989. Patented July 5, 1898.
W. GOLDING.
PNEUMATIC TIRE FOR WHEELS.
(Application filed Apr. 1, 1896.)
(No Model.)

Witnesses:

Inventor:
William Golding

UNITED STATES PATENT OFFICE.

WILLIAM GOLDING, OF WITHINGTON, ENGLAND, ASSIGNOR, BY MESNE ASSIGNMENTS, TO THE MORGAN & WRIGHT, OF CHICAGO, ILLINOIS.

PNEUMATIC TIRE FOR WHEELS.

SPECIFICATION forming part of Letters Patent No. 606,989, dated July 5, 1898.

Application filed April 1, 1896. Serial No. 585,801. (No model.) Patented in England October 28, 1891, No. 18,541.

*To all whom it may concern:*

Be it known that I, WILLIAM GOLDING, inventor and patentee, a subject of the Queen of Great Britain, residing at Withington, England, have invented certain new and useful Improvements in and Relating to Pneumatic or Air-Inflated Tires for Wheels, of which the following is a specification.

Figure 1:
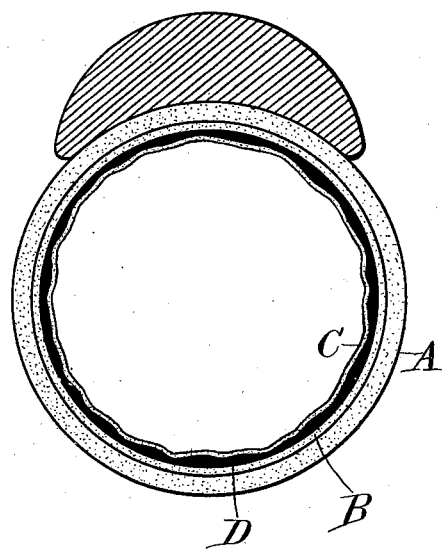
Figure 2:
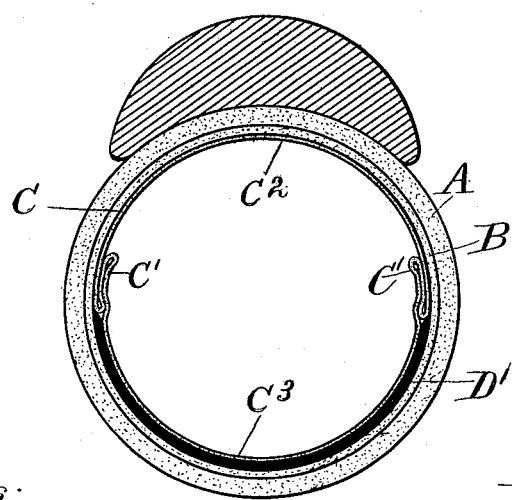

Figure 1 is a section taken transversely through a pneumatic tire having a layer of viscous material confined between the inflatable air-tube proper and an inner tube or tubular layer of larger dimensions than the inflated air-tube. Fig. 2 is a like view showing the layer of viscous material extending partially around opposing surfaces of the two tubes.

My invention comprises an improvement in pneumatic tires, for which I have received British Letters Patent No. 18,541, dated October 28, 1891, and it relates to modifications in the construction of puncture closing and healing air-tubes such as are described in the specifications of my former British patents, No. 15,376, dated September 11, 1891, and No. 18,383, dated October 26, 1891, and the said invention may be applied to any of the figures of the drawings of said former British Letters Patent. I therein describe an inflatable tube for pneumatic or air-inflated tires constructed with a layer of "unvulcanized" (which term includes partly-vulcanized) rubber, which may be used attached upon a layer of vulcanized rubber in a state of lateral compression or between two or more layers of vulcanized rubber under compression laterally, or one of such layers being compressed and one stretched when inflated, the object of the layer of unvulcanized rubber being to cement punctured holes across, owing to its adhesiveness and the lateral pressure to which it is subjected.

The present modification consists in substituting for unvulcanized rubber to be used in the manner and for the purpose described in my said specifications any viscous or glutinous substance, such as bird-lime or any other substance or material or mixture having similar properties and which may also be mixed or combined with native rubber or other allied gums.

In Fig. 1 the casing A of the tire is shown on an ordinary wheel-rim for the purpose of illustrating its customary use. The inner inflatable air-tube B is inflated or distended so as to lie against the inner wall of the casing. C indicates a tube or tubular lining which is of larger diameter than the diameter of the distended air-tube, and hence will pucker or wrinkle substantially as illustrated. D denotes the layer of viscous material confined between the tubes B and C.

Another modification in construction is as follows: When such adhesive substance has less consistency than native rubber and is sufficiently plastic and viscous, it may be placed as a thin layer between two concentric tubes or between a tube and an attached strip, all of thin vulcanized rubber. The adhesive layer being of a more plastic nature than native rubber, it requires less lateral compression in the attached layers of vulcanized rubber to effect cementation of a punctured hole. This amount of compression I obtain by constructing the tube of larger diameter than the interior hollow of the outer tire or casing when fully stretched by the stress of the contained compressed air. The air-tube lies loose within the restraining-envelop of the tire, and being larger it is slightly curved or puckered when uninflated. When inflated and the puckers pressed flat, a certain amount of lateral compression is put in, sufficient with the aid of the viscous substance to close and cement the hole up, so as to prevent the escape of air.

In my aforesaid British Patent No. 15,376, dated September 11, 1891, I describe and show in Figs. 24 to 27 of the drawings annexed to and forming part of that patent a construction of tire in which the outer air-tube incloses an inner tube of larger dimensions, the surplus material of which lies in folds or gathers or the like in the outer inflated tube, so that when the tire is punctured the slack of the inner tube will be drawn on in such a way that when the tire is again in normal shape the inner layer or tube will have shifted at the point of puncture, so as to close the puncture of the outer tube. The viscous material which under my present improvement is interposed between the two layers or laminæ will permit this local shifting of the surplus material of the inner tube and at the same time hold the same firmly in shifted position.

In Fig. 2 the casing A contains an inflatable air-tube B, which is shown distended so as to lie against the inner wall of the casing. In this figure the tube C, which is arranged within the tube B, is considerably larger than the tube B, so that it will wrinkle or gather, as indicated by the folds C' C'. The portion C² of the tube C can be secured to the inner tube, if desired, and in such case the layer D' of viscous material will be arranged between the slack portion C³ of the tube C and the portion of tube B at the thread side of the tire. With such arrangement the slack portion of the tube C forms a shifting or adjustable layer of fabric which can be adjusted independently of the tube B, so as to place punctures through such parts out of register.

Another modification in construction is as follows: When the viscous substance used has more consistency and is less plastic than the condition just previously described, as is the case with unvulcanized rubber, I construct a tube so as to use the action of contraction while the tube is passing from an inflated to a deflated condition for supplying the necessary force of contract for effecting cementation of a punctured hole. This inflatable tube is constructed, preferably, of two thin concentric tubes of vulcanized rubber, with a thin tube of unvulcanized rubber or its substitute placed or solutioned in between, or it may be made of three concentric tubes of unvulcanized rubber, the inner and outer containing an admixture of sulfur and the middle one of pure rubber without sulfur and vulcanizing them together. In this latter case the middle tube becomes partially vulcanized by contact, and is not so efficient as when wholly unvulcanized. This tube is constructed of much smaller diameter in cross-section than normal, so that when inflated it will be stretched considerably before it can fill up the hollow bore of the tire. When it is fully inflated, the tube of unvulcanized rubber or its substitute forming the adhesive layer is stretched beyond its capacity to recover of itself and is, in fact, remolded into a larger tube, though it still retains its normal amount of elasticity, which is very small, and is stretched to the small extent allowed by such elasticity. As a result of this arrangement a puncture makes a wider hole in the vulcanized rubber, which is considerably stretched, than it does in the adhesive layer. Upon deflation or collapse the vulcanized rubber contracts until the hole in it is nearly closed, while the part of the hole through the adhesive layer is closed together with sufficient pressure to cement it up. Instead of three complete tubes it may be constructed of one or more tubes and a strip or strips. This puncture-closing air-tube is not so desirable in use as those described in my aforesaid specifications, as when constructed as therein described any ordinary puncture, however often repeated, has no effect upon the air-tube and need not be noticed, whereas in this case a dismount and reinflation are necessary. This tube is, however, smaller and consequently lighter and cheaper than the others.

Having now particularly described and ascertained the nature of my said invention and in what manner the same is to be performed, I declare that what I claim is—

1. An inflatable tube for a pneumatic tire constructed of larger size than normal of two concentric tubes (or of a tube and strip) of vulcanized rubber and of a tube or layer of a viscous or glutinous semiliquid substance placed between the two tubes or strips of vulcanized rubber so as to cement them together, substantially as and for the purpose hereinbefore described.

2. An inflatable tube for a pneumatic tire constructed of smaller size than normal of two or more concentric tubes, strips, or laminæ of vulcanized rubber containing a layer interposed between them of plastic and viscous material such as bird-lime, the whole being combined together throughout their contiguous surfaces into a single tube, substantially as and for the purpose hereinbefore described.

3. A pneumatic tire comprising a layer of viscous and sticky semiliquid matter confined between a couple of tubes or concentric layers.

4. A pneumatic tire comprising an air-tube having an inner tube and an intervening layer of viscous semiliquid material such as bird-lime or the like.

5. A pneumatic tire comprising a casing, an inner air-tube, a rim-tube arranged within the air-tube, and a layer of viscous semiliquid material arranged between the two tubes and possessing certain properties of bird-lime.

6. An inflatable air-tube for a pneumatic tire in combination with an inner tube of greater dimensions than the outer tube whereby its walls are gathered or folded at one or more points within the outer tube, and an interposed layer of viscous material, substantially as and for the purposes hereinbefore set forth.

7. The combination with a pneumatic-tire tube of a layer of fabric capable of being adjusted independently of the tire-tube, and a layer of viscous material between the tire-tube and adjustable layer of fabric, substantially as described.

In testimony whereof I have hereunto set my hand in presence of two subscribing witnesses.

WILLIAM GOLDING.

Witnesses:
ARTHUR HENRY WALKER,
WILLIAM EDWARD CROWTHER.